United States Patent [19]

Okey et al.

[11] Patent Number: 4,933,131

[45] Date of Patent: Jun. 12, 1990

[54] METHOD OF FABRICATING COMPOSITE STRUCTURES

[75] Inventors: David W. Okey; Hossein Saatchi, both of Rockford; John F. Scanlon, Roscoe, all of Ill.

[73] Assignee: Sundstrand Corporation, Rockford, Ill.

[21] Appl. No.: 138,970

[22] Filed: Dec. 29, 1987

[51] Int. Cl.$^5$ .................... B29C 45/14; B29C 45/16
[52] U.S. Cl. .................... 264/255; 264/257; 264/261; 264/331.15; 264/331.21
[58] Field of Search .................... 264/257, 258, 46.5, 264/255, 261, 331.15, 331.21

[56] References Cited

U.S. PATENT DOCUMENTS

| | | | |
|---|---|---|---|
| 2,806,509 | 9/1957 | Bozzacco et al. | 428/241 |
| 4,013,810 | 3/1977 | Long | 428/308 |
| 4,025,686 | 5/1977 | Zion | 428/310 |
| 4,250,136 | 2/1981 | Rex | 264/257 |
| 4,303,728 | 12/1981 | Houdek | 264/46.5 |
| 4,379,103 | 4/1983 | Doerfling | 264/45.5 |
| 4,405,543 | 9/1983 | Murphy et al. | 264/109 |
| 4,490,317 | 12/1984 | Kliewer | 264/46.5 |
| 4,512,836 | 4/1985 | Tucci | 264/258 |
| 4,543,289 | 9/1985 | Park | 428/46.5 |
| 4,572,856 | 2/1986 | Genbinski | 264/46.5 |
| 4,657,717 | 4/1987 | Gattanach | 264/257 |
| 4,728,698 | 3/1988 | Isayev | 264/331.21 |

Primary Examiner—Jay H. Woo
Assistant Examiner—Jeremiah F. Durkin, II
Attorney, Agent, or Firm—Wood, Phillips, Mason, Recktenwald & VanSanten

[57] ABSTRACT

A method of fabricating a composite structure having at least one skin molecularly bonded to a core. A skin is provided of reinforcing fibrous material and a thermoplastic matrix. The skin is thermoformed to the general exterior shape of the composite strucutre. The skin is placed in a mold, and a core material is injected into the mold against the skin under isostatic conditions. The core material includes a thermoplastic matrix compatible to the thermoplastic matrix of the skin to form a molecular bond therewith.

6 Claims, 1 Drawing Sheet

METHOD OF FABRICATING COMPOSITE STRUCTURES

FIELD OF THE INVENTION

This invention generally relates to a method of fabricating a composite structure and, particularly, to a method of thermoforming a composite structure having at least one skin molecularly bonded to a core.

BACKGROUND OF THE INVENTION

Composite structures often are fabricated in a laminated array, typically including a core, such as of foam, sandwiched between a pair of outer structural skins, typically fabricated of a resin and a reinforcing fiber, and bonded together by some sort of adhesive. Such composite structures typically are generally planar in geometry due to limits in processing technology. Thermoset resin systems predominantly are used with such composite structures. Epoxy resins, bismaleimeide, and polyimide resins are typical thermoset resins which are used. They have short shelf lives, require refrigeration and careful handling and storage. The reinforcing fibers typically have a tensile modulus much greater than the resin, and are much stronger. The composite material resulting from their combination thereby is enhanced. Typical reinforcing fibers are graphite, glass and Kevlar. The cores typically are fabricated of foam or honeycomb construction. For instance, cores can be made of lightweight, low-density materials, such as polymethacrylimide foams, phenolic foams, aramid honeycomb, aluminum honeycomb, and the like. Composite structures are made from these materials by machining the core and then bonding the composite material skin to the core. Such composite structures have found widespread acceptance in various industries, such as the aerospace industry, because they can save significant amounts of weight over previously used metallic parts.

Due to labor intensity in processing composite structures of the character described, particularly those structures fabricated from thermosetting materials, considerable expense is involved, as well as time-consuming preparation of the core. They also are not readily repairable. Fully cured structures offer few free polymer chains for molecular level bonding to a repair material. Techniques have been devised to foam-in-place an epoxy core between the skins of composite material. However, the interface is weak because of the required adhesive between the parts.

On the other hand, thermoplastics are reformable, readily repairable and inherently much more impact-resistant than thermosets. The use of thermoplastics for continuous fiber reinforced structures has, however, been limited by an inability to achieve consolidated structures with suitable dispersion of resin, fiber reinforcements and other components. Nevertheless, improvements are being made. For instance, U.S. Pat. No. 4,837,251, dated June 6, 1989, assigned to the assignee of this invention, and which is incorporated herein by reference, a new and improved composition for a pressure molded core of a composite structure is disclosed. In addition, a new and improved method of fabricating a composite structure is shown in copending application Ser. No. 139,007, filed Dec. 29, 1987, (Docket No. B02676). As disclosed therein, a skin composed of reinforcing material and a thermoplastic matrix is provided. The skin is thermoformed to the general exterior shape of the composite structure. A core is molded into the general shape of the composite structure, the core having a thermoplastic matrix compatible to the matrix of the skin. The composite structure then is final-formed by placing the skin and the core in juxtaposition in a forming mold, and a thermoplastic coating material is injected into the mold under isostatic conditions. The thermoplastic coating material is compatible to the thermoplastic matrices of the skin and the core. Therefore, the thermoplastic matrices of the skin, the core and the coating molecularly bond the entire composite structure into an integral, substantially homogeneous construction with the molecular bond about and throughout the parts of the composite structure.

In U.S. Pat. No. 4,013,810 to Long, dated Mar. 22, 1977, thermoplastic materials are used to form the skins of a sandwich structure along with a core of a compatible thermoplastic material and a filler of hollow glass spheres. However, the core is preformed or cast into an initial shape and then the face sheets or skins are manufactured to the shape required and placed over the foam core and remolded under pressure and heat.

Lastly, an example of an advanced composite structure with which the invention is readily applicable is shown in copending application Ser. No. 191,250, filed May 6, 1988, (Docket No. B02490), assigned to the assignee of this invention, and which is incorporated herein by reference. That application involves an irregularly shaped housing, such as for a dynamoelectric machine, and includes various components such as conduits, electrical devices, etc. embedded within the core of the composite structure.

This invention is directed to a further improvement in fabricating composite structures to provide a molecular bond between a core and one or more skins of the composite structure.

SUMMARY OF THE INVENTION

An object, therefore, of the invention is to provide a new and improved method of fabricating a composite structure embodying extensive use of thermoplastic materials.

In the exemplary embodiment of the invention, the composite structure has at least one skin molecularly bonded to a core. Usually, the core is sandwiched between a pair of skins.

The method includes the steps of providing a skin composed of reinforcing material and a thermoplastic matrix. The skin is thermoformed to the general shape of the composite structure. The skin is placed in a mold, and a core material is injected into the mold against the skin under isostatic conditions. The core material includes a thermoplastic matrix compatible to the thermoplastic matrix of the skin to form a molecular bond therewith. Of course, the invention contemplates injecting the core material between a pair of skins to form a completely molecularly bonded laminated composite structure.

The compatible thermoplastic matrices of the skins and the core molecularly bond the entire composite structure into an integral, substantially homogeneous construction with the reinforcing material of the skin and any filler material of the core.

The reinforcing material of the skin may include such materials as graphite fibers or other fibrous materials which may be woven or braided and interspersed with the thermoplastic matrix. The skin itself may be formed of comingled graphite fibers and thermoplastic fibers.

The thermoplastic matrix of the various components may be such as polyetheretherketone. All of these materials are capable of being advantageously used to molecularly bond the construction in the final forming step wherein the thermoplastic-based core material is injected under conditions of pressure and heat.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
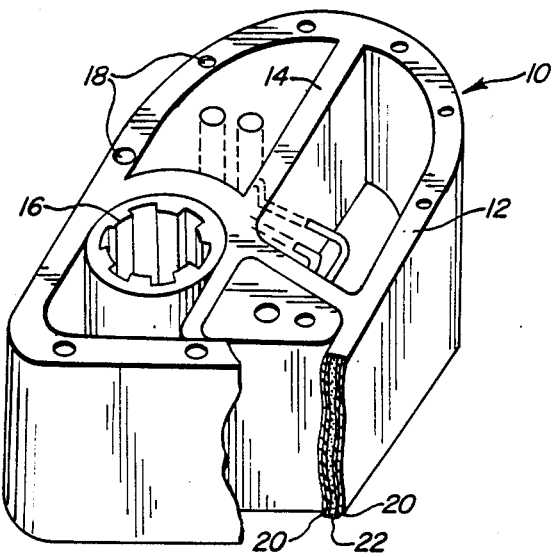
FIG. 1 is a somewhat schematic, perspective view depicting an irregularly shaped housing having walls fabricated with a composite structure according to the concepts of the invention.

Referring to the drawings in greater detail, and first to FIG. 1, the invention is directed to a method of fabricating a composite structure having at least one skin molecularly bonded to a core. FIG. 1 shows an irregularly shaped housing, generally designated 10, which may be a motor housing having exterior walls 12 and interior walls 14. Various mechanical components may be assembled to the housing during the molding process, such as a splined bushing shown at 16. In addition, bores 18 may be provided by inserts within the mold as conduits for electrical wiring or other purposes. Details of such concepts are shown in aforesaid copending application Ser. No. 191,250 (Docket No. B02490). Suffice it to say, the composite structure of walls 14,16 includes a pair of outer skins 20 between which is sandwiched a core 22.

Figure 2:
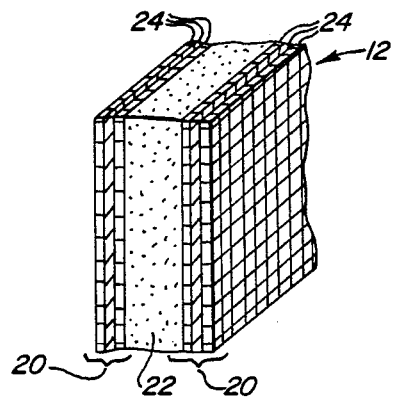
FIG. 2 is a perspective view of a section of the housing depicted in FIG. 1.

FIG. 2 shows an enlargement of a section through one of the walls 12,14. As shown, core 22 is sandwiched between outer skins 20. The skins themselves may include a plurality of layers 24 in a laminated fashion. For instance, layers of woven fabric of fibrous material, as described hereinafter, may be laid up to preform the skins. The method of this invention generally includes providing at least one skin 20 composed of reinforcing material and a thermoplastic matrix. Preferably, the reinforcing material is a fibrous material such as a woven or braided fabric. The material may be of graphite, glass or Kevlar fibers. The thermoplastic matrix may be of polyetherketone, polyetheretherketone, liquid crystal polymer or other suitable thermoplastic matrix. The skins may be formed with fibers which are prepregged or the reinforcing fibers may be comingled with thermoplastic fibers and then heated to shape the skin(s). With a common planar composite structure, two flat skins simply are prefabricated. With an irregular housing as shown at 10 in FIG. 1, various preformed skins would be made, such as a continuous outer skin, as shown, with various inner skins of different shapes to define the thicknesses of the composite walls of the housing. The size, shape, configuration, apertures, etc. of the skin would depend upon the final composite structure to be formed.

The next step is to place the skin in an appropriately shaped mold. The mold would be such as to space the skins to allow for the flow of a core material between the skins. Again, the size, shape, configuration, etc. of the mold would depend upon the final composite structure to be formed.

The invention contemplates then injecting a core material into the mold against the skin. Of course, with a "sandwich" type construction as shown in the drawings, the core material would be injected between the skins. The core material is injected under isostatic conditions, i.e. heat and pressure.

Core 22 is a foam core and has a thermoplastic matrix compatible to the thermoplastic matrix of skins 22. The core initially would include a filler material, such as hollow glass microspheres. The matrix of the core may be such as polyetherketone or polyetheretherketone. An appropriate core composition is shown in the aforesaid U.S. Pat. No. 4,837,251

As stated, the thermoplastic matrices of skins 20 and core 22 are compatible and, thereby, form a molecular bond between the components of the composite structure.

Figure 3:
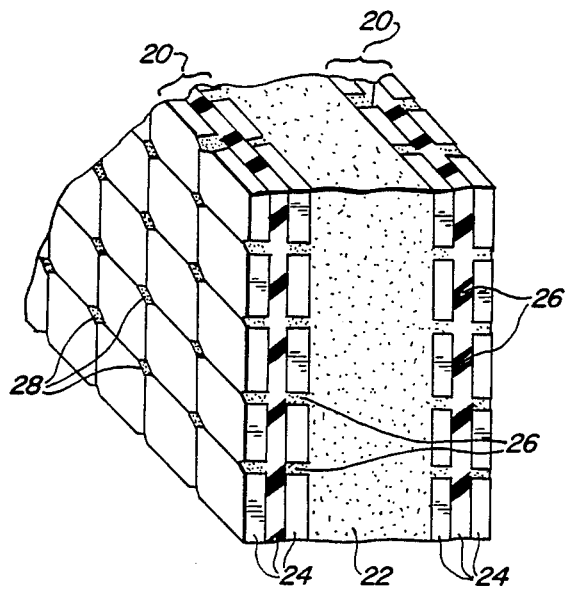
FIG. 3 is a further enlarged view of the section of FIG. 2.

In addition, FIG. 3 shows a further enlargement of a section through a composite structure including outer skins 20 and interior core 22, with skins 20 having a plurality of layers 24, such as woven fabric of reinforcing fibers. The fibers are shown in this view in a schematic fashion as square configurations simply to illustrate that the thermoplastic material of core 22 actually will bleed through the fibers, as at 26, and will bleed through the layers or plies of reinforcing material, as at 28. This further enhances the substantially homogeneous nature of the composite structure and further enhances a molecular bond throughout the entire thickness of the structure from the outside of the skins to the interior of the core. No adhesives or additional steps in the process are necessary to bond the skins to the core and, in fact, the molecular bonding throughout the structure is practically failure-proof because there are no adhesion interfaces between the components of the composite structure as with prior art methods where skins, cores and other components are prefabricated and subsequently bonded together by adhesives or the like.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A method of fabricating a composite structure having at least one skin molecularly bonded to a core, comprising the steps of:
    providing a skin composed of reinforcing material and a thermoplastic polyetheretherketone matrix;
    thermoforming the skin to the general shape of the composite structure; and
    placing the skin in a mold and injecting a core material into the mold against the skin under isostatic conditions, the core material including a thermoplastic matrix compatible to the thermoplastic matrix of the skin to form a molecular bond therewith.

2. A method of fabricating a composite structure having at least one skin molecularly bonded to a core, comprising the steps of:
providing a skin composed of reinforcing material and a thermoplastic matrix;
thermoforming the skin to the general shape of the composite structure; and
placing the skin in a mold and injecting a core material into the mold against the skin under isostatic conditions, the core material including a thermoplastic polyetheretherketone matrix compatible to the thermoplastic matrix of the skin to form a molecular bond therewith.

3. A method of fabricating a composite structure having at least one skin molecularly bonded to a core, comprising the steps of:
providing a skin composed of reinforcing material and a thermoplastic matrix;
thermoforming the skin to the general shape of the composite structure; and
placing the skin in a mold and injecting a core material into the mold against the skin under isostatic conditions, the core material including a liquid crystal polymer matrix compatible to the thermoplastic matrix of the skin to form a molecular bond therewith.

4. A method of fabricating a composite structure having at least one skin molecularly bonded to a core, comprising the steps of:
providing a skin composed of reinforcing material and a thermoplastic matrix;
thermoforming the skin to the general shape of the composite structure; and
placing the skin in a mold and injecting a core material into the mold against the skin under isostatic conditions, the core material including a thermoplastic polyetherketone matrix compatible to the thermoplastic matrix of the skin to form a molecular bond therewith.

5. A method of fabricating a composite structure having at least one skin molecularly bonded to a core, comprising the steps of:
providing a skin composed of reinforcing material and a thermoplastic polyetherketone matrix;
thermoforming the skin to the general shape of the composite structure; and
placing the skin in a mold and injecting a core material into the mold against the skin under isostatic conditions, the core material including a thermoplastic matrix compatible to the thermoplastic matrix of the skin to form a molecular bond therewith.

6. A method of fabricating a composite structure having at least one skin molecularly bonded to a core, comprising the steps of:
providing a skin composed of reinforcing material and a thermoplastic polyetherketone matrix;
thermoforming the skin to the general shape of the composite structure; and
placing the skin in a mold and injecting a core material into the mold against the skin under conditions of pressure and heat, the core material including a thermoplastic polyetheretherketone matrix compatible to the thermoplastic matrix of the skin to form a molecular bond therewith.

* * * * *